(12) United States Patent
Kida et al.

(10) Patent No.: US 11,194,324 B2
(45) Date of Patent: Dec. 7, 2021

(54) MONITOR DEVICE

(71) Applicants: TOYOTA JIDOSHA KABUSHIKI KAISHA, Toyota (JP); PANASONIC CORPORATION, Kadoma (JP)

(72) Inventors: Akihiro Kida, Toyota (JP); Tomoyuki Tsurube, Komae (JP); Nobuyuki Hirose, Yokohama (JP)

(73) Assignees: TOYOTA JIDOSHA KABUSHIKI KAISHA, Toyota (JP); PANASONIC CORPORATION, Kadoma (JP)

( * ) Notice: Subject to any disclaimer, the term of this patent is extended or adjusted under 35 U.S.C. 154(b) by 199 days.

(21) Appl. No.: 16/049,909

(22) Filed: Jul. 31, 2018

(65) Prior Publication Data

US 2019/0041849 A1 Feb. 7, 2019

(30) Foreign Application Priority Data

Aug. 1, 2017 (JP) .............................. JP2017-149307

(51) Int. Cl.
*G05D 1/00* (2006.01)
*B60W 30/00* (2006.01)
*G06K 9/46* (2006.01)
*G05D 1/02* (2020.01)
*G06K 9/00* (2006.01)

(52) U.S. Cl.
CPC ........... *G05D 1/0055* (2013.01); *B60W 30/00* (2013.01); *G05D 1/0088* (2013.01); *G05D 1/0246* (2013.01); *G06K 9/4604* (2013.01); *G06K 9/4609* (2013.01); *G06K 9/00791* (2013.01)

(58) Field of Classification Search
CPC .. G05D 1/0055; G05D 1/0088; G05D 1/0246; B60W 30/00; G06K 9/4604; G06K 9/00791
See application file for complete search history.

(56) References Cited

U.S. PATENT DOCUMENTS

| 9,773,177 B2 * | 9/2017 | Takemura .......... G06K 9/00791 |
| 10,089,540 B2 * | 10/2018 | May .......................... H04N 7/18 |
| 2012/0230601 A1 * | 9/2012 | Iso ........................... G06T 5/002 |
| | | 382/269 |
| 2015/0203076 A1 | 7/2015 | Irie et al. |

(Continued)

FOREIGN PATENT DOCUMENTS

| JP | 2014-27539 A | 2/2014 |
| JP | 2015-095886 A | 5/2015 |

*Primary Examiner* — Thomas Ingram
*Assistant Examiner* — Omar K Morsy
(74) *Attorney, Agent, or Firm* — Sughrue Mion, PLLC

(57) ABSTRACT

A monitor ECU 10 performs a support control based on a camera image photographed through a protection window by a camera 21. The ECU determines that a protection window state is an entire dirt state, when a first area index value calculated based on edge strength of pixels in a first area including a center of the camera image is smaller than a threshold dirt value. The ECU determines that the entire dirt state ends, when at least one of a first condition or a second condition is established. The first condition is established when the first area index value is equal to or greater than a first threshold end value. The second condition is established when a second area index value calculated based on the edge strength in a second area except the first area is equal to or greater than a second threshold end value.

7 Claims, 7 Drawing Sheets

(56) References Cited

U.S. PATENT DOCUMENTS

2016/0234405 A1\* 8/2016 Lu .................. H04N 5/2171
2016/0307054 A1 10/2016 Takemura et al.
2016/0321978 A1\* 11/2016 Chang ............... G09G 3/3648
2017/0109590 A1\* 4/2017 Gehrke .............. G06T 7/0002

\* cited by examiner

MONITOR DEVICE

BACKGROUND

Technical Field

The present invention relates to a monitor device for performing a support control to support driving of an own vehicle based on a camera image photographed by a camera for photographing an area around the own vehicle through a protection window.

Related Art

Hitherto a device has been known, which detects a lane marker, other vehicle, a pedestrian, a traffic sign, a parking area, and the like, based on an camera image photographed by a camera so as to support driving of an own vehicle. When dirt (such as a water droplet, fogging, a water droplet trace, mud, and the like) adheres to a lens of the camera, the device may inappropriately perform the support control.

For example, as proposed in Japanese Patent Application Laid-open No. 2015-95886, a device has been known, which detects the above dirt based on edge strength of each of pixels included in the camera image. When the proposed device detects the dirt, the device stops the support control.

SUMMARY

Generally, the edge strength of pixels located in a center area in the vicinity of the center of the camera image tends to be calculated accurately, however the edge strength of pixels located in a peripheral area of the camera image tends to be calculated to be a value smaller value than a true value. As a view angle of the lens of the camera is wider, the above tendency becomes stronger. However, the device detects the dirt without taking such a property of the camera image into consideration. Therefore, the device may sometimes be unable to accurately determine whether the dirt has adhered (or is present) and whether the adhered dirt has already been removed (or is no longer present).

The present invention has been made to solve the problem described above. The present invention has an object to provide a monitor device that can more accurately determine whether or not the dirt is present.

A monitor device (hereinafter, referred to as a "present invention device") according to the present invention comprises:
 a control unit (10) configured to perform a support control to support driving of an own vehicle based on a camera image which includes pixels and which is acquired by a camera (21) for photographing an area around the own vehicle through a protection window (22) which is exposed to outside of the own vehicle; and
 a determination unit (10) configured to:
  determine whether or not a protection window state is an entire dirt state where dirt has adhered to an entire surface of the protection window, based on edge strength (ES) of the pixels (Step 740); and
  determine whether or not the entire dirt state ends based on the edge strength, when it has been determined that the protection window state has been the entire dirt state (Step 940, Step 975).

The control unit is configured not to perform the support control, when it has been determined that the protection window state has been the entire dirt state ("No" at Step 630).

The determination unit is configured to:
 determine that the protection window state is the entire dirt state, when a first area index value (a center edge area number CEN) calculated based on the edge strength of pixels included in a first area (a center area CA) is smaller than a threshold dirt value (a threshold area number CEN1th) ("Yes" at Step 740), the first area encompassing a center of the camera image; and
 determine that the entire dirt state ends (Step 945), when at least one of a first condition or a second condition is established,
 the first condition being a condition that the first area index value is equal to or greater than a first threshold end value (a threshold area number CEN1th), and
 the second condition being a condition that a second area index value (an outer edge area number OEN) calculated based on the edge strength of pixels included in a second area (an outer area OA) other than (except) the first area in the camera image is equal to or greater than a second threshold end value (a threshold area number OEN1th).

The edge strength in the first area encompassing/including the center of the camera image tends to be calculated more accurately than the edge strength in the second area other than (except) the first area in the camera image. The present invention device determines whether or not the protection window state is the entire dirt state based on the "first area index value calculated based on the edge strength of each of pixels included in the first area where the edge strength tends to be calculated more accurately". In other words, the present invention device performs this determination without using the "second area index value calculated based on the edge strength of each of pixels included in the second area where the edge strength tends to be calculated less accurately". Therefore, the present invention device can more accurately determine whether or not the protection window state is the entire dirt state.

Further, the present invention device determine that the entire dirt state ends, when at least one of the first condition or the second condition is established. The second condition is established, when the "second area index value calculated based on the edge strength of pixels each of which is included in the second area where the edge strength tends to be calculated less accurately" is equal to or greater than the second threshold end value. Therefore, even when the camera 21 photographs a scene from which no edge is extracted/detected in the first area after the entire dirt has been removed, the present invention can more accurately determine that the entire dirt state ends.

According to an embodiment of the present invention device,
 the determination unit is configured to:
 calculate (Step 935), as the first area index value (CEN), a value correlating with the number of pixels included in the first area, each of the pixels in the first area having the edge strength which is equal to or greater than a first threshold strength (ES1th); and
 calculate (Step 970), as the second area index value (OEN), a value correlating with the number of pixels included in the second area, each of the pixels in the second area having the edge strength which is equal to or greater than a second threshold strength (ES1th).

The value correlating with the number of "pixels included in the first area, each of the pixels included in the first area having the edge strength which is in the first area having the edge strength which is equal to or greater than the first threshold strength" is calculated as the first area index value.

The value correlating with the number of "pixels included in the second area, each of the pixels in the second area having the edge strength which is equal to or greater than a second threshold strength" is calculated as the second area index value. The embodiment, which utilizes those index values, can determine that the protection window state is the entire dirt state more accurately, and can determine that the entire dirt state ends more accurately.

According to an embodiment of the present invention device, the first area is divided into a plurality of individual areas (AR), and the determination unit is configured to:
calculate (Step 735), as the first area index value, a first edge area number (CEN) indicative of the number of individual areas, each of the individual areas satisfying a condition that the number of pixels (an edge pixel number EN) included in each of the individual areas is equal to or greater than a first threshold pixel number (EN1th), each of the pixels having the edge strength equal to or greater than the first threshold strength; and
determine that the protection window state is the entire dirt state (Step 745), when the first edge area number is smaller than a first threshold area number serving as the threshold dirt value ("Yes" at Step 740).

"The first edge area number indicative of the number of individual areas, each of the individual areas satisfying a condition that the number of pixels included in each of the individual areas is equal to or greater than a first threshold pixel number, each of the pixels having the edge strength equal to or greater than the first threshold strength" is serving as the first area index value. The embodiment can determine that the protection window state is the entire dirt state more accurately, and can determine that the entire dirt state ends more accurately.

According to an embodiment of the present invention device, the second area is divided into a plurality of individual areas (AR), and the determination unit is configured to:
calculate (Step 970), as the second area index value, a second edge area number (OEN) indicative of the number of individual areas, each of the individual areas satisfying a condition that the number of pixels (an edge pixel number EN) included in each of the individual areas is equal to or greater than a second threshold pixel number, each of the pixels having the edge strength equal to or greater than the second threshold strength (EN1th); and
determine that the second condition is established, when the second edge area number is equal to or greater than a second threshold area number (OEN1th) serving as the second threshold end value ("No" at Step 975).

"The second edge area number indicative of the number of individual areas, each of the individual areas satisfying a condition that the number of pixels included in each of the individual areas is equal to or greater than a second threshold pixel number, each of the pixels having the edge strength equal to or greater than the second threshold strength" is served as the second area index value. The embodiment can determine that the entire dirt state ends more accurately.

According to an embodiment of the present invention device, the first area and the second area are divided into a plurality of individual areas (AR), and the determination unit is configured to:
determine that the protection window state is a partial dirt state where the dirt has adhered to a part of the surface of the protection window corresponding to an unchanged area (UCA) which is the individual area where the number of the pixels (UCPN) satisfying a third condition is equal to or greater than a threshold pixel number (UCPN1th), the third condition being a condition that a change amount in a pixel value of each of the pixels included in the individual area in a predetermined time period is equal to or smaller than a threshold amount (Step 855), when the camera image includes the unchanged area ("Yes" at Step 850), and the control unit is configured not to perform the support control, when it has been determined that the protection window state has been the partial dirt state ("No" at Step 630).

The embodiment detects the dirt corresponding to "the unchanged area (UCA) which is the individual area where the number of the pixels whose pixel values do not change (remain unchanged) substantially for/over the predetermined time period" as partial dirt. The embodiment does not perform the support control based on the inaccurate camera image which is photographed through the protection window to which the partial dirt has adhered.

According to an embodiment of the present invention device, in the event of the determination unit determining that the protection window state has been the partial dirt state, the determination unit is configured to determine that the partial dirt state corresponding to the unchanged area ends (Step 965), when the number of the pixels (EN) becomes equal to or greater than a third strength threshold, each of the pixels being included in the unchanged area and having the edge strength equal to or greater than a third strength threshold (EN1th) ("Yes" at Step 960).

The embodiment determines whether or not the partial dirt state ends without using data in the areas other than/except the unchanged area. Therefore, the embodiment can determine that the partial dirt state ends more accurately.

According to an embodiment of the present invention device, the determination unit is configured to determine that the protection window state is the entire dirt state, when the own vehicle starts to be operated for running.

Snow, frost, water droplets, or the like may adhere to the protection window in a period from a time point at which the own vehicle is parked to a time point at which the own vehicle starts to be operated for running (driving). Thus, it is reasonable to assume that the dirt has adhered to the entire surface of the protection window in that period. In view of the above, the embodiment determines that the protection window state is the entire dirt state, when the own vehicle starts to be operated for running (or be ready for running). The embodiment can prohibit itself from performing the pre-collision control based on based on the inaccurate camera image which is photographed through the protection window to which the entire dirt is likely to has adhered when the own vehicle starts to be operated for running.

In the above description, in order to facilitate the understanding of the invention, reference symbols used in embodiment of the present invention are enclosed in parentheses and are assigned to each of the constituent features of the invention corresponding to the embodiment. However, each of the constituent features of the invention is not limited to the embodiment as defined by the reference symbols.

DETAIL DESCRIPTION

A monitor device (hereinafter referred to as a "this monitor device") according to an embodiment of the present invention will next be described with reference to the accompanying drawings. A vehicle in which the control device is installed is referred to as an "own vehicle SV", when this vehicle needs to be distinguished from other vehicles.

Figure 1:
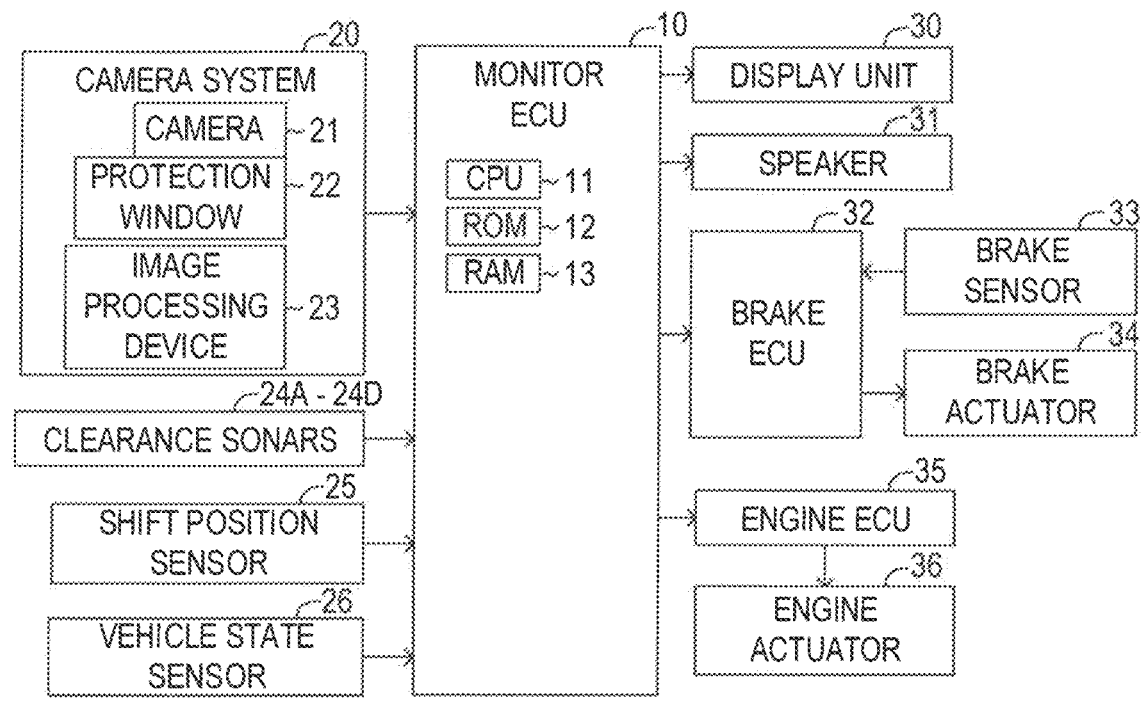
FIG. 1 is a schematic system configuration diagram of a monitor device (this monitor device) according to an embodiment.

This monitor device performs a support control to support driving of the own vehicle SV based on a camera image which a camera 21 included in a camera system 20 shown in FIG. 1 photographs through a protection window 22. This monitor device determines whether or not dirt has adhered to the protection window 22. When this monitor device determines that the dirt has adhered to the protection window 22, the monitor device prohibits itself from performing (or does not perform) the support control based on the camera image which the camera 21 photographs through the protection window 22 to which the dirt has adhered.

As shown in FIG. 1, this monitor device comprises a monitor ECU 10. The monitor ECU 10 comprises a microcomputer including a CPU 11, a ROM 12, a RAM 13, and the like. It should be noted that an ECU is an abbreviation of an "Electronic Control Unit" which includes a microcomputer as a main part. The microcomputer includes a CPU, and memories (for example, a ROM, a RAM, and the like). The CPU achieves various functions by executing instructions (program, routine) stored in the ROM.

This monitor device comprises a camera system 20, clearance sonars 24A through 24D, a shift position sensor 25, a vehicle state sensor 26, a display unit 30, a speaker 31, a brake ECU 32, a brake sensor 33, a brake actuator 34, an engine ECU 35, and an engine actuator 36. The monitor ECU 10 is connected to the camera system 20, the clearance sonars 24A through 24D, the shift position sensor 25, the vehicle state sensor 26, the display unit 30, the speaker 31, the brake ECU 32, and the engine ECU 35. The clearance sonars 24A through 24D are collectively referred to as "clearance sonars 24".

Figure 2:
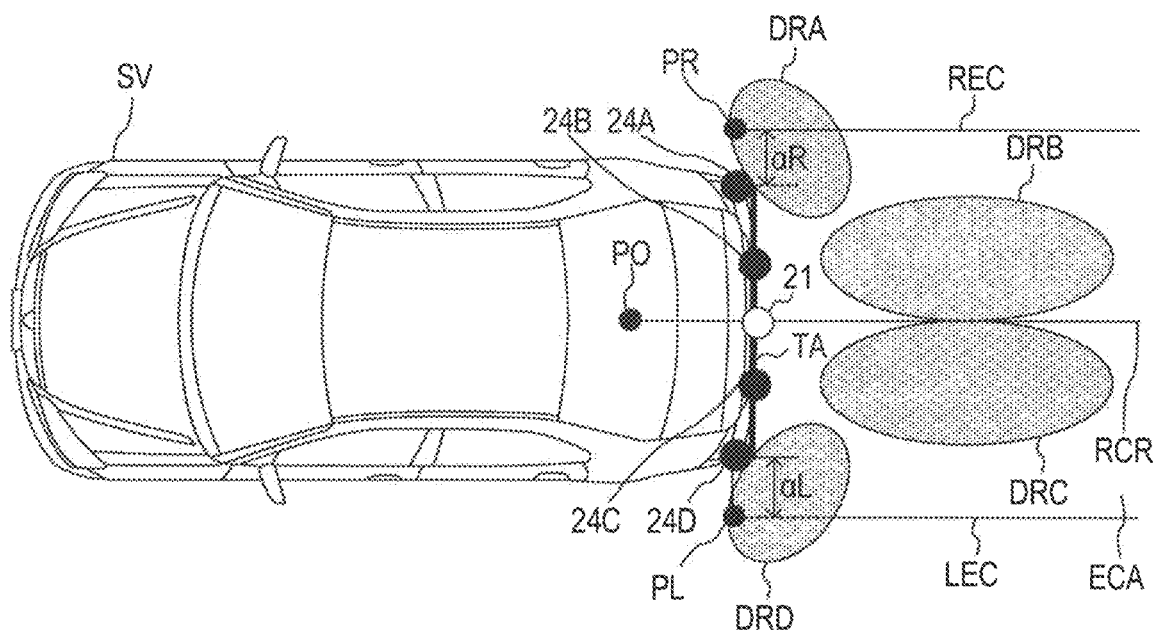
FIG. 2 is a diagram illustrating a position at which a camera is arranged, positions at which clearance sonars are arranged, and a predicted travel path.

The camera system 20 includes the camera 21 and an image processing device 23. As shown in FIG. 2, the camera 21 is arranged at the center in a width direction in a rear end of the own vehicle SV. Referring back to FIG. 1, the camera 21 is attached to an outer side of the own vehicle SV. The camera 21 has the protection window 22 which is a transparent plate. The protection window 22 protects a lens of the camera 21 from a water droplet, mud, dust, and the like. The camera 21 photographs a scene of a backward area of the own vehicle SV through the protection window 22. It should be noted that an angle of view of the camera 21 is wide, i.e. about 180 deg. The camera 21 photographs the scene to transmit an image (a camera image or camera image data) photographed by the camera 21 to the image processing device 23, every time a predetermined time period elapses.

The image processing device 23 selects/extracts an object whose type is coincident with one of predetermined types (a pedestrian, a vehicle, a motorcycle, a bicycle, and the like) from the camera image photographed by the camera 21. More specifically, the image processing device 23 stores an image feature amount of the object of each of the predetermined types as a matching pattern in advance. The image processing device 23 divides the camera image into local areas, each of which has a predetermined size, so as to calculate the image feature amount of each of the local areas. The image processing device 23 compares the calculated image feature amount with each image feature amount which is stored as the matching pattern so as to select/extract the object from the camera image. The image processing device 23 transmits, to the monitor ECU 10, the camera image data which includes the camera image, type data expressing the type of the selected/extracted object, and position data expressing a position of the selected/extracted object in the camera image, every time a predetermined time period elapses.

Each of the clearance sonars 24 detects a location of a 3D object (object) which is located in the backward area of the own vehicle SV and a relative velocity of the object in relation to the own vehicle SV using an ultrasonic wave. More specifically, each of the clearance sonars 24 emits (transmits) the ultrasonic wave. When the object is present within an emission range of the ultrasonic wave, the object reflects the ultrasonic wave. When the clearance sonar 24 receives the reflected ultrasonic wave, the clearance sonar 24 calculates a distance between the own vehicle SV and the object based on a time period from a time point of the emission of the ultrasonic wave to a time point of the receipt of the ultrasonic wave, and a direction of the object in relation to the own vehicle SV based on the direction of the reflected ultrasonic wave. The location of the object is specified based on "the distance between the own vehicle SV and the object" and the direction of the object in relation to the own vehicle SV. Further, the clearance sonar 24 calculates the relative velocity of the object based on frequency change (by the Doppler effect) of the reflected ultrasonic wave. The clearance sonars 24 transmit object information including the location of the object and the relative velocity of the object to the monitor ECU 10.

As shown in FIG. 2, the clearance sonars 24A through 24D are arranged at the rear end of the own vehicle SV so as to be spaced from each other by a predetermined distance in the width direction of the own vehicle SV. The clearance sonar 24A is arranged at a right end of the rear end of the own vehicle SV so as to detect an object which is present in an area DRA which expands around a right corner in the backward area of the own vehicle SV. The clearance sonar 24B is arranged at a right side of the rear end of the own vehicle SV so as to detect an object which is present in an area DRB which expands toward a right backward of the own vehicle SV. The clearance sonar 24C is arranged at a left side of the rear end of the own vehicle SV so as to detect an object which is present in an area DRC which expands toward a left backward of the own vehicle SV. The clearance sonar 24D is arranged at a left end of the rear end of the own vehicle SV so as to detect an object which is present in an area DRD which expands around a left corner in the backward area of the own vehicle SV.

Referring back to FIG. 1, the shift position sensor 25 detects a position (hereinafter referred to as a "shift position") of a shift lever to be operated by the driver so as to transmit a signal indicative of the detected shift position. The shift position includes a parking range "P", a drive range "D", a reverse range "R", a neutral range "N", and the like. The monitor ECU 10 acquires (detects) the shift position from the shift position sensor 25, every time a predetermined time period elapses.

The vehicle state sensor 26 includes a vehicle velocity sensor for detecting a velocity (a vehicle velocity) Vs of the own vehicle SV, an acceleration sensor for detecting an acceleration As in a front-rear direction in a horizontal plane of the own vehicle SV and an acceleration As in a left-right direction in the horizontal plane of the own vehicle SV, a yaw rate sensor for detecting a yaw rate Yr of the own vehicle SV, a steering angle sensor for a steering angle θ of steered wheels, and the like. The monitor ECU 10 acquires (detects) vehicle state information which includes the vehicle velocity Vs, the accelerations As, the yaw rate Yr, and the steering angle θ, every time a predetermined period elapses.

When the shift position acquired from the shift position sensor 25 is "R", in other words, when the own vehicle SV runs backwards, the monitor ECU 10 fuses the camera image information with the object information so as to specify the location of the object which is present in the backward area of the own vehicle SV. When the object with a high probability of colliding with the own vehicle SV is present in the backward area of the own vehicle SV, the monitor ECU 10 alerts/warns the driver of the presence of the object, using the display unit 30 and the speaker 31. If the object's probability of colliding with the own vehicle SV becomes higher than the object's probability at the time point at which the monitor ECU 10 alerted/warmed the driver, the monitor ECU 10 controls the brake ECU 32 and the engine ECU 35 such that the vehicle velocity Vs of the own vehicle SV is decreased so as to stop the own vehicle SV before the own vehicle SV collides with the object.

The display unit 30 is a "Head Up Display" (hereinafter referred to as a "HUD") which receives display information from each of the ECUs in the own vehicle SV and a navigation device, and displays the received display information on a partial area (a display area) of a front glass of the own vehicle SV. The display unit 30 displays an alert screen which has the driver pay attention to the object (obstacle) which has the high probability of colliding with the own vehicle SV and which is present in the backward area of the own vehicle SV. When the display unit 30 receives a display instruction signal which is a display instruction to display the alert screen from the monitor ECU 10, the display unit 30 displays the alert screen. In some embodiments, the display unit 30 is a liquid-crystal display.

When the speaker 31 receives, from the monitor ECU 10, an output instruction signal to output/generate alert sound, the speaker 31 outputs/generates the alert sound in order to have the driver pay attention to the obstacle in response to the received output instruction signal.

The brake ECU 32 is connected to "the vehicle velocity sensor for detecting the vehicle velocity Vs". The vehicle velocity sensor is included in the vehicle state sensor 26. The brake ECU 32 is connected to brake sensors 33. The brake ECU 32 receives detection signals from those sensors. The brake sensors 33 detects parameters which the brake ECU 32 uses when the brake ECU 32 controls a brake device (not shown) installed in the own vehicle SV. The brake sensors 33 includes a sensor for detecting a brake pedal operating amount (depressing amount), or the like.

The brake ECU 32 is connected to a brake actuator 34. The brake actuator 34 is a hydraulic control actuator. The brake actuator 34 is provided in an unillustrated hydraulic circuit between an "unillustrated master cylinder which pressurizes working oil by using a depressing force applied to the brake pedal" and "unillustrated friction brake mechanisms including well-known wheel cylinders". Each of the wheel cylinders is provided in each of wheels. The brake actuator 34 adjusts oil pressure applied to the wheel cylinder. The brake ECU 32 drives the brake actuator 34 so as to generate braking force (frictional braking force) at each of the wheels to thereby adjust the acceleration (a negative acceleration, i.e. a deceleration) of the own vehicle SV.

When the brake ECU 32 receives a brake instruction signal from the monitor ECU 10, the brake ECU 32 controls the brake actuator 34 such that an actual acceleration As of the own vehicle SV matches a target deceleration TG included in the brake instruction signal, to thereby decrease the vehicle velocity Vs through braking. It should be noted that the monitor ECU 10 acquires the acceleration As of the own vehicle SV from the acceleration sensor included in the vehicle state sensor 26.

The engine ECU 35 is connected to the engine actuator 36. The engine actuator 36 changes an operational state of an engine (not shown) which is a driving source of the own vehicle SV. The engine actuator 36 includes at least one throttle valve actuator for changing opening of a throttle valve. The engine ECU 35 drives the engine actuator 36 so as to change torque generated by the engine. In this manner, the engine ECU 35 can change driving force of the own vehicle SV. When the monitor ECU 10 transmits the brake instruction signal to the brake ECU 32, the monitor ECU 10 transmits a torque decreasing instruction signal to the engine ECU 35. When the engine ECU 35 receives the torque decreasing instruction signal, the engine ECU 35 drives the engine actuator 36 (in actuality, the engine ECU 35 drives the throttle valve actuator so as to change the opening of the throttle valve to the minimum opening) to thereby change the torque of the engine to the minimum torque.

<Outline of Operation>

An operation of this monitor device will next be described. As described above, this monitor device detects the object(s) which is present in the backward area of the own vehicle SV based on the camera image taken by the camera 21 and the detection results of the clearance sonars 24. This monitor device selects/extracts the obstacle(s) with the high probability of colliding with the own vehicle SV among the detected objects. This monitor device calculates a collision time period (time to collision) TTC indicative of a time period which it takes the obstacle to collide with own vehicle SV or to reach the closest point to the own vehicle SV. A process for selecting/extracting the obstacle and a process for calculating the time to collision TTC will be described later.

When the time to collision TTC is equal to or shorter than a time threshold T1th for an alert control, this monitor device transmits the above display instruction signal to the display unit 30 and the above output instruction signal to the speaker 31 so as to perform the alert control for alerting the driver of the presence of the obstacle. The alert control is one of support controls which support the driving by the driver.

When the time to collision TTC is equal to or shorter than a time threshold T2th for a collision prevention control, this monitor device calculates the target deceleration TG which is required to stop the own vehicle SV before the own vehicle SV collides with the obstacle. It should be noted that the time threshold T2th is set to a value smaller than the above time threshold T1th. This monitor device transmits the above brake instruction signal including the target deceleration TG to the brake ECU 32 and the above torque decreasing instruction signal to the engine ECU 35 so as to perform a brake control. The brake control is one of the support controls.

As described above, this monitor device detects the object based on the above camera image and the detection results of the clearance sonars 24. Therefore, when dirt has adhered to (or is present on) the protection window 22 of the camera 21, this monitor device becomes unlikely to be able to detect the object accurately.

There are two types of the dirt adheres to the protection window 22. One type of the dirt is "entire dirt (full cover dirt)" which adheres to an entire surface of the protection window 22 (to fully cover the entire surface), such as snow, water droplets, snow melting agents. The other type of the dirt is "partial dirt" adheres to a part of the surface of the protection window 22, such as mud. This monitor device performs an entire dirt determination process for determining whether or not a state of the protection window 22 is an entire dirt state (which is a state in which the entire dirt has adhered to the protection window 22). This monitor device also performs a partial dirt determination process for determining whether or not the state of the protection window 22 is a partial dirt state (which is a state in which the partial dirt has adhered to the protection window 22).

When it is determined that the state of the protection window 22 is at least one of the entire dirt state and the partial dirt state, this monitor device prohibits itself from performing controls based on the camera image, in other words, the above described alert control and the above described brake control. Further, this monitor device performs a dirt removed determination process, including a "first process for determining whether or not the entire dirt is removed so that the entire dirt state ends, the first process being performed when it is (or has been) determined that the state of the protection window 22 is the entire dirt state" and a "second process for determining whether or not the partial dirt is removed so that the partial dirt state ends, the second process being performed when it is (or has been) determined that the state of the protection window 22 is the partial dirt state". When it is determined that the state of the protection window 22 is a no-dirt-state through the dirt removed determination process, in other words, when all of the dirt states end, the controls based on the camera image is allowed to be performed by this monitor device.

Figure 3:
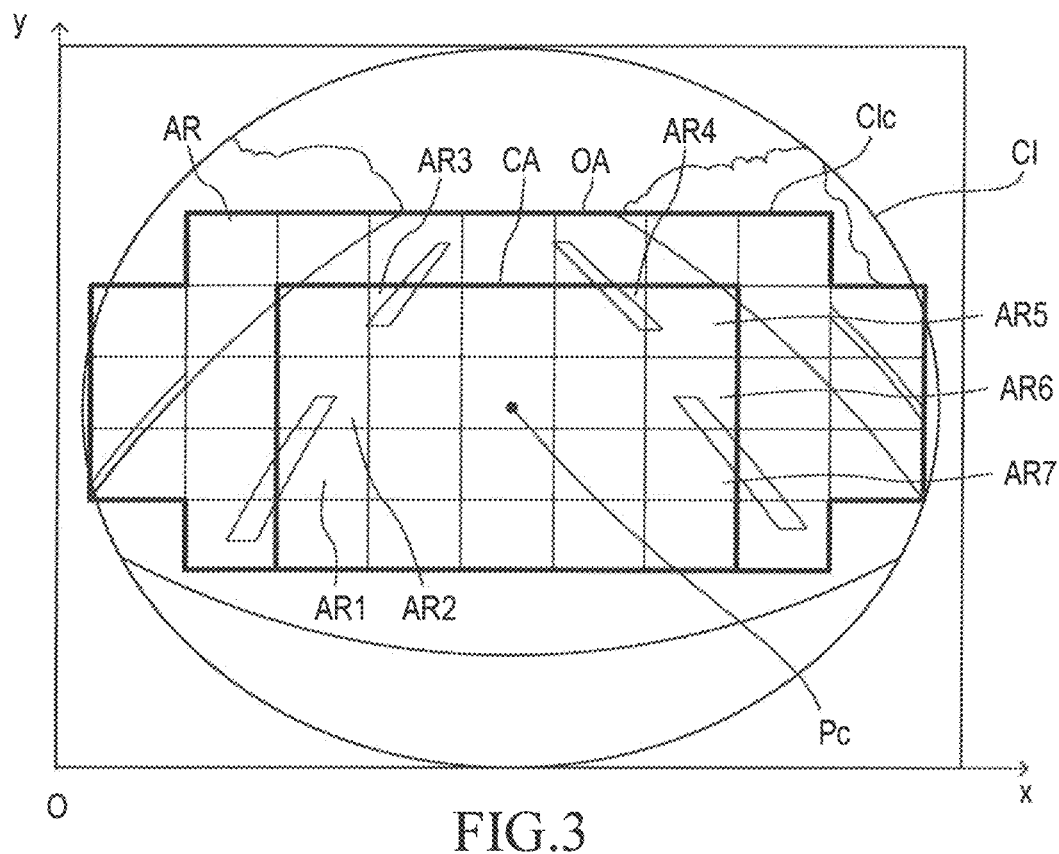
FIG. 3 is a diagram illustrating a center area and an outside area in a camera image.

Firstly, the entire dirt determination process is described. As shown in FIG. 3, This monitor device divides the camera image CI which has an ellipse shape into "a determination area CIc which encompasses/includes a center point Pc of the camera image CI" and an area other than (outside/except) the determination area CIc. This monitor device further divides the determination area CIc into a "center area CA which has a rectangle shape encompassing/including the center point Pc" and an "outer area OA which is outside of the center area CA". The center area CA may be referred to as a "first area", and the outer area OA may be referred to as a "second area". The determination area CIc is divided into a plurality of individual areas AR. Each of the individual areas AR has a rectangle shape. In the example shown in FIG. 3, the center area CA includes 20 (twenty) individual areas AR, and the outer area OA includes 21 (twenty one) individual areas AR.

In general, a part at (in the vicinity of) the center point of the camera image is the clearest in the camera image. As a distance between a part of the camera image and the center point of the camera image is longer, the part of the camera image becomes more unclear. In other words, a blur degree in the camera image is the smallest at the center point of the camera image, and a blur degree in the camera image is greater at a point farther away from the center point of the camera image. Therefore, in general, edge strength of an area in the vicinity of the center of the camera image is greater than edge strength of an area in the vicinity of a periphery of the camera image. Thus, the edge strength of the outer area OA is relatively small, and the edge strength of the center area CA is relatively great, because the outer area OA is farther from the center point of the camera image CI than the center area CA.

This monitor device executes the entire dirt determination process using the above described property of the camera image. Firstly, this monitor device calculates horizontal direction edge strength ESx of each of pixels included in (belonging to) each of the individual areas AR in accordance with an expression 1, and vertical direction edge strength ESy of each of the pixels included in (belonging to) each of the individual areas AR in accordance with an expression 2. Next, this monitor device calculates edge strength ES of each of the pixels included in (belonging to) each of the individual areas AR in accordance with an expression 3.

$$ESx = I(x,y) - I(x-1,y) \tag{1}$$

$$ESy = I(x,y) - I(x,y-1) \tag{2}$$

$$ES = \sqrt{ESx^2 + ESy^2} \tag{3}$$

A pixel which is located at the bottom left corner of each of the individual areas AR is defined as an origin O of x-y coordinates (for each of the individual areas AR). A horizontal direction of each of the individual areas AR is defined as an x axis. A vertical direction of each of the individual areas AR is defined as a y axis. "I(x, y)" in the above expressions 1 and 2 represents a pixel value (R, G, B) of the pixel at the coordinates (x, y). The horizontal direction edge strength ESx is a vector which has component values (XR, XG, XB) corresponding to red, green, and blue, respectively. The magnitude of the horizontal direction edge strength ESx is represented by the following expression.

$$|ESx| = (XR^2 + XG^2 + XB^2)^{1/2}.$$

Similarly, the vertical direction edge strength ESy is a vector which has component values (YR, YG, YB) corresponding to red, green, and blue, respectively. The magnitude of the vertical direction edge strength ESy is represented by the following expression.

$$|ESy| = (YR^2 + YG^2 + YB^2)^{1/2}$$

Subsequently, this monitor device counts the number of pixels (hereinafter referred to as an "edge pixel number") EN for each of the individual areas AR, each of the pixels having the edge strength ES which is equal to or greater than a threshold strength (a first threshold strength) ES1th. This monitor device specifies the individual area(s) AR, each of which edge pixel number EN is equal to or greater than a threshold pixel number (a first threshold pixel number) EN1th. The individual area AR whose edge pixel number EN is equal to or greater than the threshold pixel number EN1th is referred to as a "strong edge area". This strong edge area is an area where an edge can be detected clearly.

Subsequently, this monitor device counts the number of the strong edge areas CEN among the individual areas AR included in (belonging to) the center area CA. Hereinafter, the number of the strong edge areas CEN may be referred to as a "center edge area number", a "first edge area number" or a "first area index value".

This monitor device determines whether or not the center edge area number CEN is smaller than a threshold area number CEN1th. For example, the threshold area number CEN1th is set to "1".

When the center edge area number CEN is equal to or greater than the threshold area number CEN1th, this monitor device determines that the state of the protection window 22 is not the entire dirt state. In the example shown in FIG. 3, if the dirt has not adhered to the protection window 22, edges of white lines on a road are detected in the individual areas AR1 through AR7 included in the center area CA. Therefore, this monitor device specifies each of the individual areas AR1 through AR7 as the strong edge area. In this case, the center edge area number CEN is equal to or greater than the threshold area number CEN1th, because the center edge area number CEN is "7 (seven)". Therefore, this monitor device determines that the state of the protection window 22 is not the entire dirt state.

Figure 4:
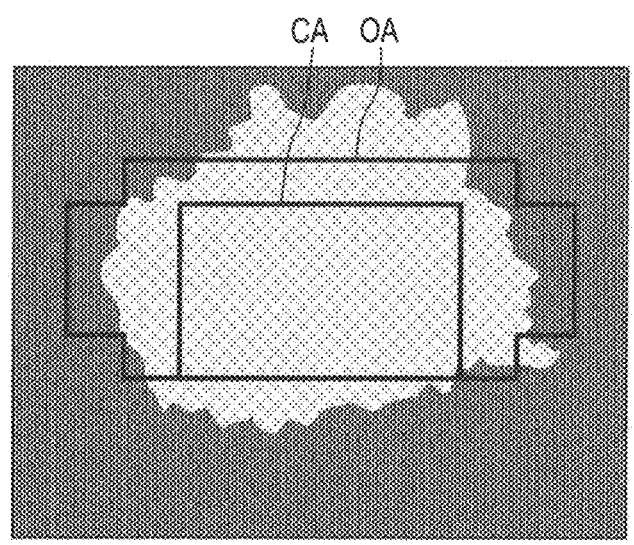
FIG. 4 is a diagram illustrating a camera image photographed in a state where dirt is adhered to a protection window.

On the other hand, when the center edge area number CEN is smaller than the threshold area number CEN1th, this monitor device determines that the state of the protection window 22 is the entire dirt state, in other words, that the state of the protection window 22 is the "state where the dirt has adhered to the entire surface of the protection window 22". No edges is likely to be detected in the center area CA and no edges is likely to be detected in the outer area OA, when the dirt has adhered to the entire surface of the protection window 22. FIG. 4 shows an example of the camera image photographed by the camera 22 when snow has adhered to the entire surface of the protection window 22. In the camera image shown in FIG. 4, the center edge area number CEN is smaller than the threshold area number CEN1th, because the center edge area CEN is "0". Therefore, in this case, this monitor device determines that the state of the protection window 22 is the entire dirt state.

As described above, the edge strength ES in the outer area OA tends to be smaller than the edge strength ES in the center area CA. Even if the state of the protection window 22 is not the entire dirt state, a "possibility that the individual area AR included in the outer area OA is specified as the strong edge area" is low. Therefore, this monitor device determines whether or not the state of the protection window 22 is the entire dirt state, without using the number of the strong edge areas included in (belonging to) the outer area OA, but through using the number of the strong edge areas included in (belonging to) the center area CA. Accordingly, a possibility that this monitor device can determine whether or not the state of the protection window 22 is the entire dirt state accurately can be improved/increased.

In a case where this monitor device has determined that the state of the protection window 22 is the entire dirt state, this monitor device determines that entire dirt is removed, in other words, that the entire dirt state ends, when at least one of the following conditions (1) or (2) is established. The condition (1) may be referred to as a "first condition", and the condition (2) may be referred to as a "second condition".

Condition (1): the center edge area number CEN is equal to or greater than the threshold area number CEN1th.

Condition (2): the number of the strong edge areas included in (belonging to) the outer area OA (hereinafter referred to as an "outer edge area number", a "second edge area number", or a "second area index value") OEN is equal to or greater than a threshold area number OEN1th which is a second threshold end value.

The strong edge area in the outer area OA is the individual area AR with the edge pixel number equal to or greater than a second threshold pixel number, the edge pixel number being the number of the edge pixels with the edge strength ES equal to or greater than a second threshold strength. Although in this embodiment, the second threshold strength is set to the same value as the first threshold strength ES1th, in some embodiments, the second threshold strength is set to a value different from the first threshold strength ES1th. In addition, in this embodiment, the second threshold pixel number is set to the same value as the first threshold pixel number EN1th, in some embodiments, the second threshold pixel number is set to a value different from the first threshold pixel number EN1th.

Furthermore, in this embodiment, the threshold area number OEN1th is set to "1", as with the threshold area number CEN1th, in some embodiments, these threshold area numbers OEN1th and CEN1th are different from each other.

As described above, the edge strength ES in the outer area OA tends to be smaller than the edge strength ES in the center area CA. Accordingly, when the outer edge area number OEN in the outer area OA is equal to or greater than the threshold area number OEN1th, in other words, when the condition (2) is established, it is considered that the dirt which had adhered to the entire surface of the protection window 22 has been removed. When the outer edge area number OEN is equal to or greater than the threshold area number OEN1th, it is considered in general that the center edge area number CEN is equal to or greater than the threshold area number CEN1th, in other words, that the condition (1) is also established.

Figure 5:
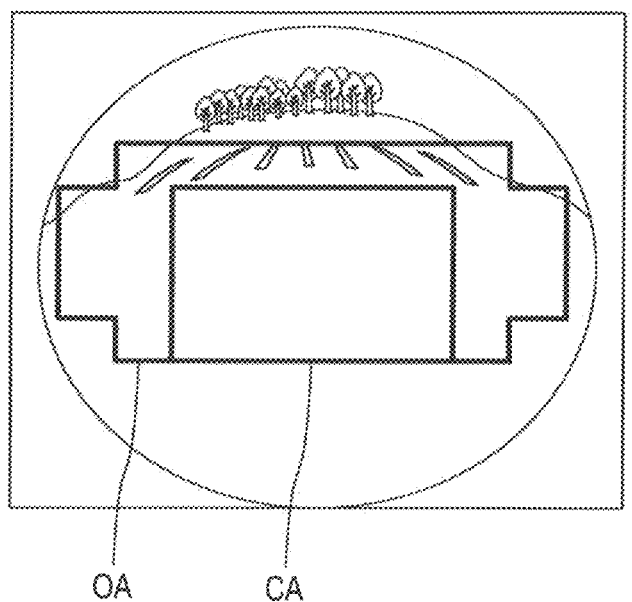
FIG. 5 is a diagram illustrating a camera image of which no edge is extracted in the center area.

Meanwhile, a case may arise where no edge is detected in the center area CA and some edges are detected in the center area CA, depending on the scene photographed by the camera 21, as shown in FIG. 5. In the camera image shown in FIG. 5, the center edge area number CEN is smaller than the threshold area number CEN1th so that the condition (1) is not established, because no edge is detected in the center area CA. In contrast, the outer edge area number OEN is equal to or greater than the threshold area number OEN1th, because edges of 7 (seven) white lines are detected in the areas which are located in the outer area OA and above the center area CA. In the camera image shown in FIG. 5, the condition (1) is not established, however the condition (2) is established. Therefore, this monitor device can determine that the state of the protection window 22 is the no-dirt-state (even if the scene photographed by the camera 21 is such a scene shown in FIG. 5). That is, when only the condition (2) is established, this monitor device determines that the entire dirt state ends.

Next, the partial dirt determination process is described. This monitor device performs a process for specifying an area where pixel values do not change (remains unchanged) substantially, every time a predetermined time period elapses. Further, this monitor device specifies the individual area AR whose pixel values do not change (remains unchanged) substantially for predetermined processing times as an unchanged area UCA. When the unchanged area UCA specified by this monitor device is present, this monitor device specifies the unchanged area UCA as a partial dirt area to determine that the state of the protection window 22 is the partial dirt state.

When this monitor device has determined that the state of the protection window 22 is the partial dirt state, this monitor device determines whether or not each of the partial dirt areas (the unchanged areas UCA) turns into a dirt removed strong edge area. The dirt removed strong edge area is the individual area AR with the number of "pixels which is included in the partial dirt area and whose edge strength is equal to or greater than a threshold strength (a third threshold strength)" being equal to or greater than a threshold pixel number. When all of the individual areas AR which has been determined as the partial dirt areas have turned into the dirt removed strong edge areas, this monitor device determines that the state of the protection window 22 becomes a state where there is no partial dirt (part), in other words, that the partial dirt state ends. Although, in this embodiment, the third threshold strength is set to the same value as the first threshold strength ES1th, in some embodiments, the third threshold strength is set to a value different from the first threshold strength ES1th. In addition, in this embodiment, the third threshold pixel number is set to the same value as the first pixel number EN1th, in some embodiments, the third threshold pixel number is set to a value different from the first threshold pixel number EN1th.

As understood from the above example, in the entire dirt determination process, the number of the strong edge areas in the outer area OA where the strong edge area is not easy to be detected is not used, but the number (the center edge area number CEN) of the strong areas in the center area CA where the strong area is easy to be detected is used. That is, when the center edge area number CEN is smaller than the threshold area number CEN1th, this monitor device determines that the state of the protection window 22 is the entire dirt state. In this manner, this monitor device determines whether or not the state of the protection window 22 is the entire dirt state based on the number (CEN) of the strong edge areas in the center area CA. Therefore, this monitor device can determine whether or the state of the protection window 22 is the entire dirt state accurately.

In the case where the state of the protection window 22 is the entire dirty state, this monitor device determines that the entire dirt is (has been) removed when at least one of the conditions (1) and (2) (i.e. condition (1) and/or condition (2)) is established. Thus, when the outer edge area number OEN obtained for the "outer area OA where the edge strength ES tends to be smaller than the edge strength ES in the center area CA" is equal to or greater than the threshold area number OEN1th, this monitor device determines that the entire dirt is (has been) removed, even if the center edge area number CEN is smaller than the threshold area number CEN1th. Therefore, this monitor device can accurately determine whether or not the entire dirt is removed. In addition, as described above, even if no edge is detected in the center area CA of the camera image, this monitor device can accurately determine that the entire dirt is (has been) removed, when the condition (2) is established.

<Specific Operation>

Figure 6:
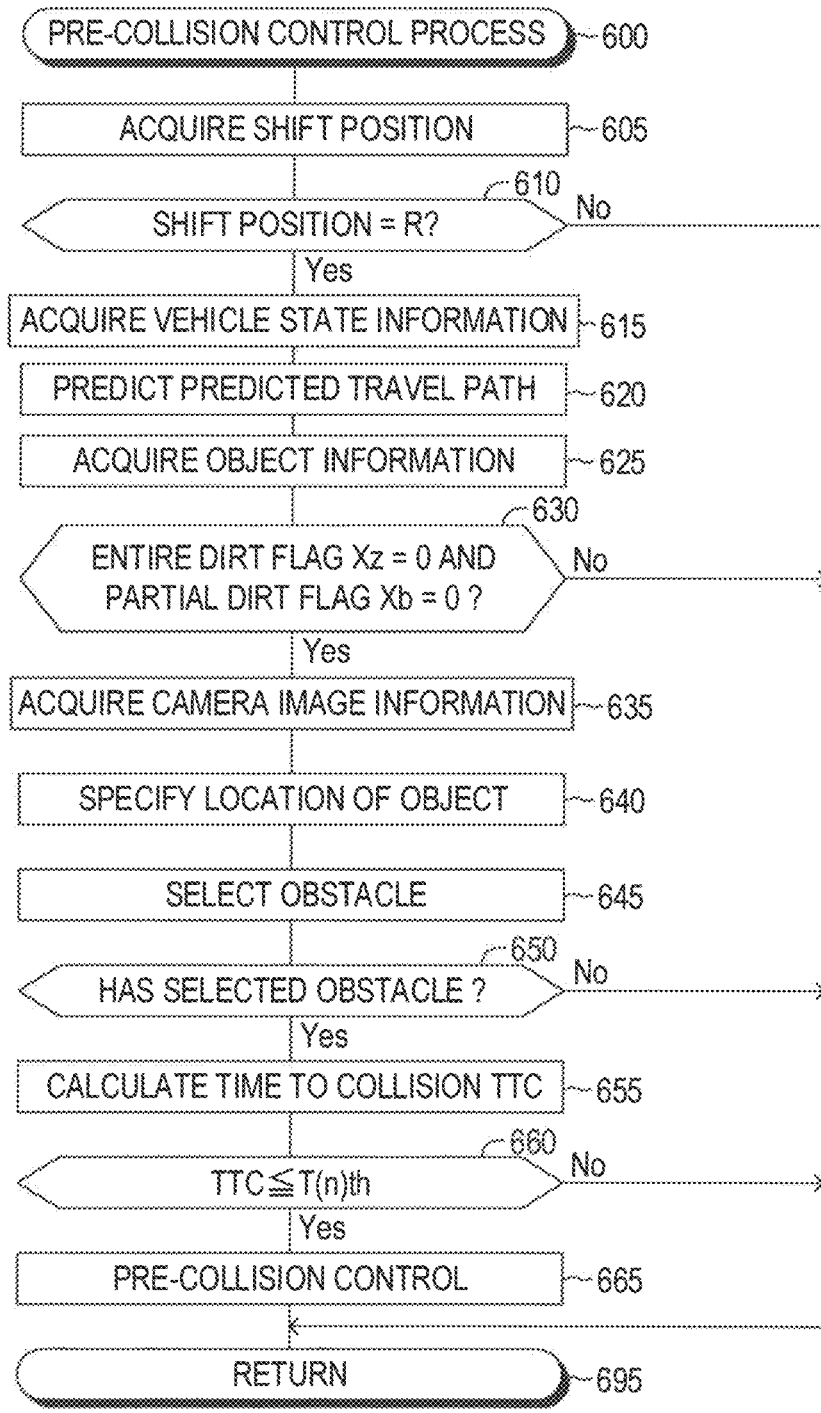
FIG. 6 is a flowchart illustrating a routine which is executed by a CPU of a monitor ECU.

The CPU 11 of the monitor ECU 10 executes a routine represented by a flowchart shown in FIG. 6, every time a predetermined time period elapses. The routine shown in FIG. 6 is a routine for performing a pre-collision control (a pre-collision control when the own vehicle SV runs backward) which is one of the support controls against the obstacle which is present in the backward area of the own vehicle SV when the own vehicle SV runs backward.

When a predetermined timing has come, the CPU 11 starts the process from Step 600 shown in FIG. 6, and proceeds to Step 605 to acquire the shift position from the shift position sensor 25. Subsequently, the CPU 11 proceeds to Step 610 to determine whether or not the shift position acquired at Step 605 is the reverse range ("R"). When the shift position is not "R", in other words, when the shift position is the drive range ("D"), the neutral range ("N"), or the like, the CPU 11 makes a "No" determination at Step 610. Thereafter, the CPU 11 proceeds to Step 695 so as to tentatively terminate the present routine. As a result, the pre-collision control is not performed.

On the other hand, when the shift position is "R", the CPU 11 makes a "Yes" determination at Step 610, and proceeds to Step 615. At Step 615, the CPU 11 acquires the vehicle state information from the vehicle state sensor 26, and proceeds to Step 620.

At Step 620, the CPU 11 predicts a predicted travel path RCR (refer to FIG. 2) along which the own vehicle SV will travel, based on the vehicle state information acquired at Step 615, and proceeds to Step 625.

The process at Step 620 is described more specifically with reference to FIG. 2.

The CPU 11 calculates a turning radius of the own vehicle SV based on "the vehicle velocity Vs of the own vehicle SV and the yaw rate Yr" included in the vehicle state information acquired at Step 615. Thereafter, the CPU 11 predicts, as the predicted travel path RCR, a travel path along which "the center point PO (refer to FIG. 2) of a wheel axis connecting a rear left wheel and a rear right wheel" will move, based on the calculated turning radius. When the yaw rate Yr is generated (nonzero), the CPU 11 predicts an arc travel path as the predicted travel path RCR. When the yaw rate is "0", the CPU 11 predicts a straight travel path along a direction of the acceleration of the own vehicle SV as the predicted travel path RCR.

Referring back to FIG. 6, at Step 625, the CPU 11 acquires the object information from the clearance sonars 24, and proceeds to Step 630. At Step 630, the CPU 11 determines whether or not both a value of an entire dirt flag Xz and a value of a partial dirt flag Xb are "0". The value of the entire dirt flag Xz is set to "1" when it is determined that the state of the protection window 22 is the entire dirt state through the process described later. In a case where the value of the entire dirt flag Xz is "1", the value of the entire dirt flag Xz is set to "0" when it is determined that the entire dirt state ends through the process described later. The value of the partial dirt flag Xb is set to "1" when it is determined that the state of the protection window 22 is the partial dirt state through the process described later. In a case where the value of the partial dirt flag Xb is "1", the value of the partial dirt flag Xb is set to "0" when it is determined that the partial dirt state ends through the process described later. Therefore, at Step 630, the CPU 11 substantially determines whether or not "no-dirt-information representing that the state of the protection window 22 is the no-dirt-state" has been stored in the RAM 13.

When at least one of the value of the entire dirt flag Xz and (or) the value of the partial dirt flag Xb is "1", in other words, when at least one of "entire dirt information representing that the state of the protection window 22 is the entire dirt state" and "partial dirt information representing that the state of the protection window 22 is the partial dirt state" has been stored in the RAM 13, the CPU 11 makes a "No" determination at Step 630, and proceeds to Step 695 to tentatively terminate the present routine. When the state of the protection window 22 is at least one of the entire dirt state and (or) the partial dirt state, the object is unlikely to be detected accurately, because the dirt is displayed on the camera image photographed through the protection window 22. In this case, the CPU 11 may perform the pre-collision control incorrectly. In view of the above, in this case, the CPU 11 prohibits itself from performing (i.e., does not perform) the pre-collision control.

On the other hand, when both the value of the entire dirt flag Xz and the value of the partial dirt flag Xb are "0", that is, when the no-dirt-information has been stored in the RAM 13, the CPU 11 makes a "Yes" determination at Step 630, and proceeds to Step 635 to acquire the camera image information from the camera system 20. Subsequently, the CPU 11 proceeds to Step 640. At Step 640, the CPU 11 fuses the object information acquired at Step 625 with the camera image information acquired at Step 635, to specify the location(s) of the object(s) in relation to the own vehicle SV.

Thereafter, the CPU 11 proceeds to Step 645 to select, as the obstacle, the object which has the high probability of colliding with the own vehicle SV or which is predicted to excessively/extremely approaches the own vehicle SV, among the objects whose locations are specified at Step 640, based on the predicted travel path RCR predicted at Step 620, the location of the object specified at Step 640, and the relative velocity of the object.

The process at Step 645 is described more specifically with reference to FIG. 2.

The CPU 11 predicts, based on the "predicted travel path RCR" with a finite length, a predicted left travel path LEC along which a point PL will move and a predicted right travel path REC along which a point PR will move. The point PL is a point positioned leftward by a predetermined distance αL from a left end of a body of the own vehicle SV. The point PR is a point positioned rightward by a predetermined distance αR from a right end of the body of the own vehicle SV. That is, the predicted left travel path LEC is a path obtained by parallelly shifting the predicted traveling path RCR to the left direction of the own vehicle SV by a "distance obtained by adding a half of a vehicle-body width to the predetermined distance αL". The predicted right travel path REC is a path obtained by parallelly shifting the predicted travel path RCR to the right direction of the own vehicle SV by a "distance obtained by adding a half of the vehicle-body width to the predetermined distance αR". Each of the distance αL and the distance αR is a distance which is equal to or longer than "0". The distance αL and the distance αR may be the same as each other, or may be different from each other. The CPU 11 specifies/designates, as a predicted travel path area ECA, an area between the predicted left travel path LEC and the predicted right travel path REC.

Thereafter, the CPU 11 calculates/predicts a moving trajectory of the object based on the past locations/positions of the object. The CPU 11 calculates/predicts a moving direction of the object in relation to the own vehicle SV, based on the calculated moving trajectory of the object. Subsequently, the CPU 11 selects/extracts, as the obstacle(s) which has a probability (high probability) of colliding with the own vehicle SV, one or more of the objects which has been in the predicted travel path area ECA and which will intersect with a rear end area TA of the own vehicle SV, and one or more of the objects which will be in the predicted traveling path area ECA and which will intersect with the rear end area TA of the own vehicle SV, based on the predicted traveling path area ECA, relative relationships (the relative locations and the relative velocities) of the objects in relation to the own vehicle SV, and the moving directions of the objects in relation to the own vehicle SV. The rear end area TA is an area represented by a line segment between the point PL and the point PR.

The CPU 11 predicts the "trajectory/path along which the point PL will move" as the predicted left travel path LEC, and predicts the "trajectory/path along which the point PR will move" as the predicted right travel path REC. If both of the values αL and αR are positive values, the CPU 11 determines the "object which has been in the predicted travel path area ECA and will intersect with the rear end area TA" or the "object which will be in the predicted travel path area ECA and will intersect with the rear end area TA", as the object with probability of passing near the left side or the right side of the own vehicle SV." Accordingly, the CPU 11 can select/extract, as the obstacle, the object with the probability of passing near the left side or the right side of the own vehicle SV.

Referring back to FIG. 6, after the CPU 11 executes the process at Step 645, the CPU 11 proceeds to Step 650 to determine whether or not the CPU 11 has selected any one of the objects as the obstacle at Step 645. When the CPU 11 has selected none of the objects as the obstacle at Step 645, the CPU 11 makes a "No" determination at Step 650, and proceeds to Step 695 to tentatively terminate the present routine. As a result, the pre-collision control is not performed. On the other hand, when the CPU 11 has selected any one of the objects as the obstacle at Step 645, the CPU 11 makes a "Yes" determination at Step 650, and proceeds to Step 655.

At Step 655, the CPU 11 calculates, for each of the obstacle(s), the time to collision TTC which it takes for each of the obstacle(s) to intersect with the rear end area (refer to FIG. 2) of the own vehicle SV, and proceeds to Step 660.

The process at Step 655 is described more specifically.

The CPU 11 calculates the time to collision TTC of the obstacle through dividing the distance between the own vehicle SV and the obstacle by the relative velocity of the obstacle in relation to the own vehicle SV.

The time to collision TTC is either a time period T1 or a time period T2, described below.

The time period T1 is a time period which it takes for the obstacle to collide with the own vehicle SV (a time period from the present time point to a predicted collision time point).

The time period T2 is a time period which it takes for the obstacle which has probability of passing near either side of the own vehicle SV to reach the closest point to the own vehicle SV (a time period from the present time point to the time point when the obstacle most closely approaches the own vehicle SV).

The time to collision TTC is a time period which it takes for the obstacle to reach the "rear end area TA of the own vehicle SV" under an assumption that the obstacle and the own vehicle SV move with keeping the relative velocity and the relative moving direction at the present time.

Further, the time to collision TTC represents a time period which it takes for this monitor device to be allowed/able to perform the pre-collision control or a time period which it takes for the driver to be allowed/able to perform a collision preventing operation for preventing the collision between the obstacle and the own vehicle SV. The time to collision TTC is an index value indicative of a collision probability of the collision. As the time to collision TTC is shorter, the collision probability is greater/higher. As the time to collision TTC is longer, the collision probability is smaller/lower.

At Step 660, the CPU 11 determines whether or not each of the times to collision TTC calculated at Step 655 is equal to or shorter than at least one of time thresholds T(n)th. When all of the times to collision TTC is longer than any of the time thresholds T(n)th, the CPU 11 makes a "No" determination at Step 660, and proceeds to Step 695 to tentatively terminate the present routine. In contrast, when at least one of the times to collision TTC is equal to or shorter than at least one of the time thresholds T(n)th, the CPU 11 makes a "Yes" determination at Step 660, and proceeds to Step 665 to perform the pre-collision control corresponding to the time threshold T(n)th which the time to collision TTC is equal to or shorter than. Thereafter, the CPU 11 proceeds to Step 695 to tentatively terminate the present routine.

In the present example, the time thresholds T(n)th includes the time threshold T1th for the alert control and the time threshold T2th for the brake control. The time threshold T1th is longer than the time threshold T2th. When any one of the times to collision TTC is equal to or shorter than the time threshold T1th, the CPU 11 transmits the display instruction signal to the display unit 40 so as to display the alert screen on the display unit 30, and transmits the output instruction signal to the speaker 31 so as to output the alert sound from the speaker 31. When any one of the times to collision TTC is equal to or shorter than the time threshold T2th, the CPU 11 selects the obstacle with the minimum time to collision TTC among the obstacles with the time to collision TTC which is equal to or shorter than the time threshold T2th. The CPU 11 calculates a deceleration (the target deceleration TG) which is required to stop the own vehicle SV before the own vehicle SV collides with the selected obstacle, based on the relative velocity of the selected obstacle and the location of the selected obstacle. Thereafter, the CPU 11 transmits the brake instruction signal including the target deceleration TG to the brake ECU 32, and transmits the torque decreasing instruction signal to the engine ECU 35. As a result, the own vehicle SV decelerates at a deceleration which is approximately the same as the target deceleration TG.

Figure 7:
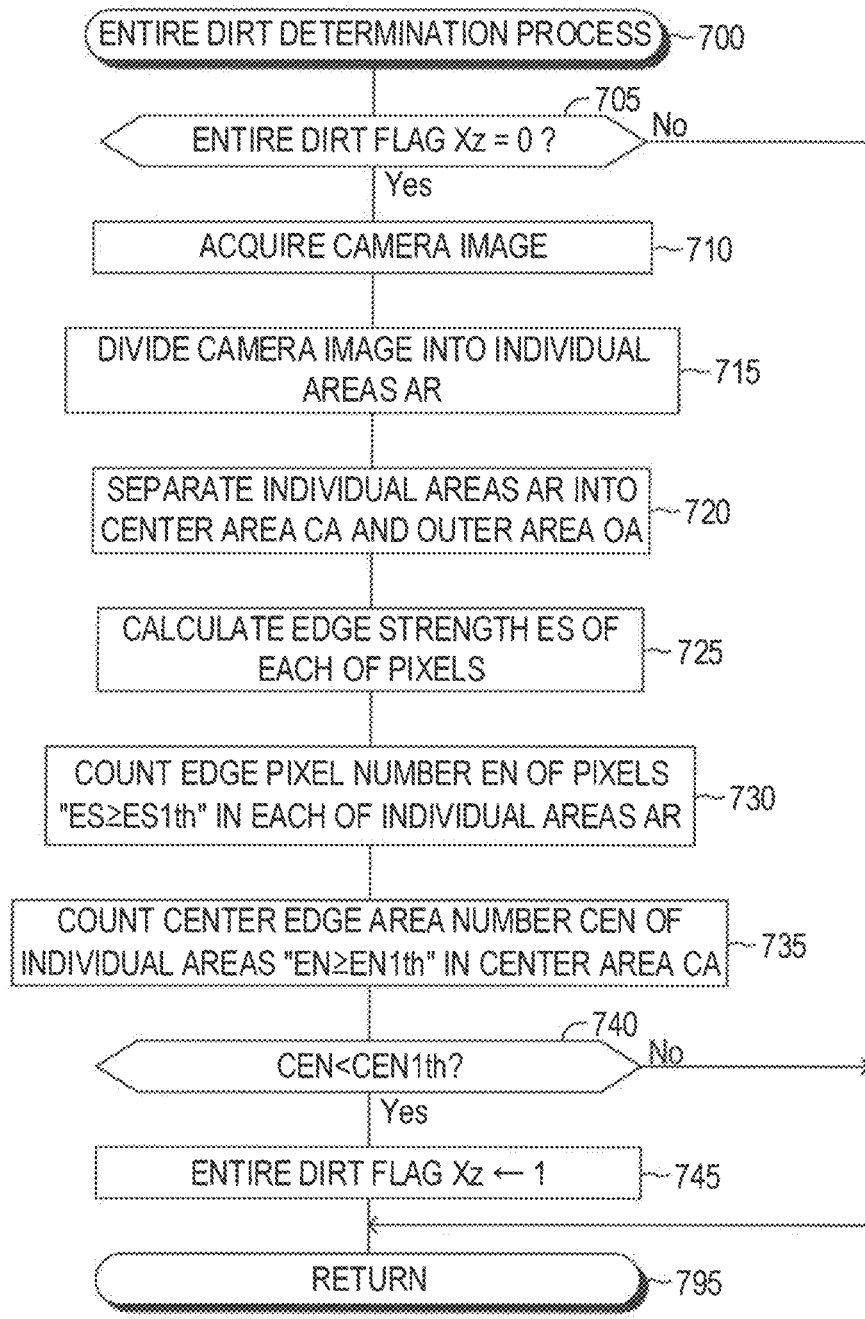
FIG. 7 is a flowchart illustrating another routine which is executed by the CPU of the monitor ECU illustrated in FIG. 1.

The CPU 11 executes a routine represented by a flowchart shown in FIG. 7, every time a predetermined time period elapses. The routine shown in FIG. 7 is a routine for determining whether or not the state of the protection window 22 is the entire dirt state.

When a predetermined timing has come, the CPU 11 starts the process from Step 700 shown in FIG. 7, and proceeds to Step 705 to determine whether or not the value of the entire dirt flag Xz is "0", in other words, whether or not the entire dirt information has been stored in the RAM 13. When the value of the entire dirt flag Xz is "1", that is, when it has been determined that the state of the protection window 22 is the entire dirt state, the CPU 11 makes a "No" determination at Step 705, and proceeds to Step 795 so as to tentatively terminate the present routine.

On the other hand, when the value of the entire dirt flag Xz is "0", that is, when the entire dirt information has not been stored in the RAM 13, the CPU 11 makes a "Yes" determination at Step 705, and executes processes from Step 710 to Step 735 in order so as to proceed to Step 740.

Step 710: The CPU 11 acquires the camera image information from the camera system 20.

Step 715: The CPU 11 divides the camera image included in (represented by) the camera image information into the individual areas AR (refer to FIG. 3).

Step 720: The CPU 11 separates the individual areas AR into the individual areas AR included/encompassed in the center area CA (refer to FIG. 3) and the individual areas AR included/encompassed in the outer area OA (refer to FIG. 3).

Step 725: The CPU 11 calculates the edge strength of each of the pixels included in the individual areas AR encompassed in the center area CA, in accordance with the above expressions 1 through 3.

Step 730: The CPU 11 counts the edge pixel number EN representing the number of pixels, each of the pixels having the edge strength equal to or greater than the threshold strength ES1th, in/for each of the individual areas AR encompassed in the center area CA.

Step 735: The CPU 11 counts the number of the individual areas AR (the center edge area number CEN) with/having the edge pixel number EN equal to or greater than the threshold pixel number EN1th.

At step 740, the CPU 11 determines whether or not the center edge area number CEN counted at Step 735 is smaller than the threshold area number (the first threshold area number) CEN1th. When the center edge area number CEN is equal to or greater than the threshold area number CEN1th, it cannot be determined that the state of the protection window 22 is the entire dirt state. Therefore, when the center edge area number CEN is equal to or greater than the threshold area number CEN1th, the CPU 11 makes a "No" determination at Step 740, and directly proceeds to Step 795 so as to tentatively terminate the routine. As a result, the entire dirt information is not stored in the RAM 13.

On the other hand, when the center edge area number CEN is smaller than the threshold area number CEN1th, it can be determined that the state of the protection window 22 is the entire dirt state. Therefore, when the center edge area number CEN is smaller than the threshold area number CEN1th, the CPU 11 makes a "Yes" determination at Step 740, and proceeds to Step 745 so as to set the value of the entire dirt flag Xz to "1". That is, the CPU 11 stores the entire dirt information into the RAM 13. Thereafter, the CPU 11 proceeds to Step 795 so as to tentatively terminate the present routine.

As understood from the above example, when the center edge area number CEN is smaller than the threshold area number CEN1th, the CPU 11 determines that the dirt has adhered to (or the dirt is present on) the entire surface of the protection window 22, so as to set the value of the entire dirt flag Xz to "1". The CPU 11 can determine whether or not the dirt has adhered to the entire surface of the protection window 22 based on the edge area number in the center area CA where the edge strength ES tends to be accurately calculated to be a value substantially equal to the true/inherent value. Therefore, the CPU 11 can determine whether or not the dirt has adhered to the entire surface of the protection window 22 accurately.

Figure 8:
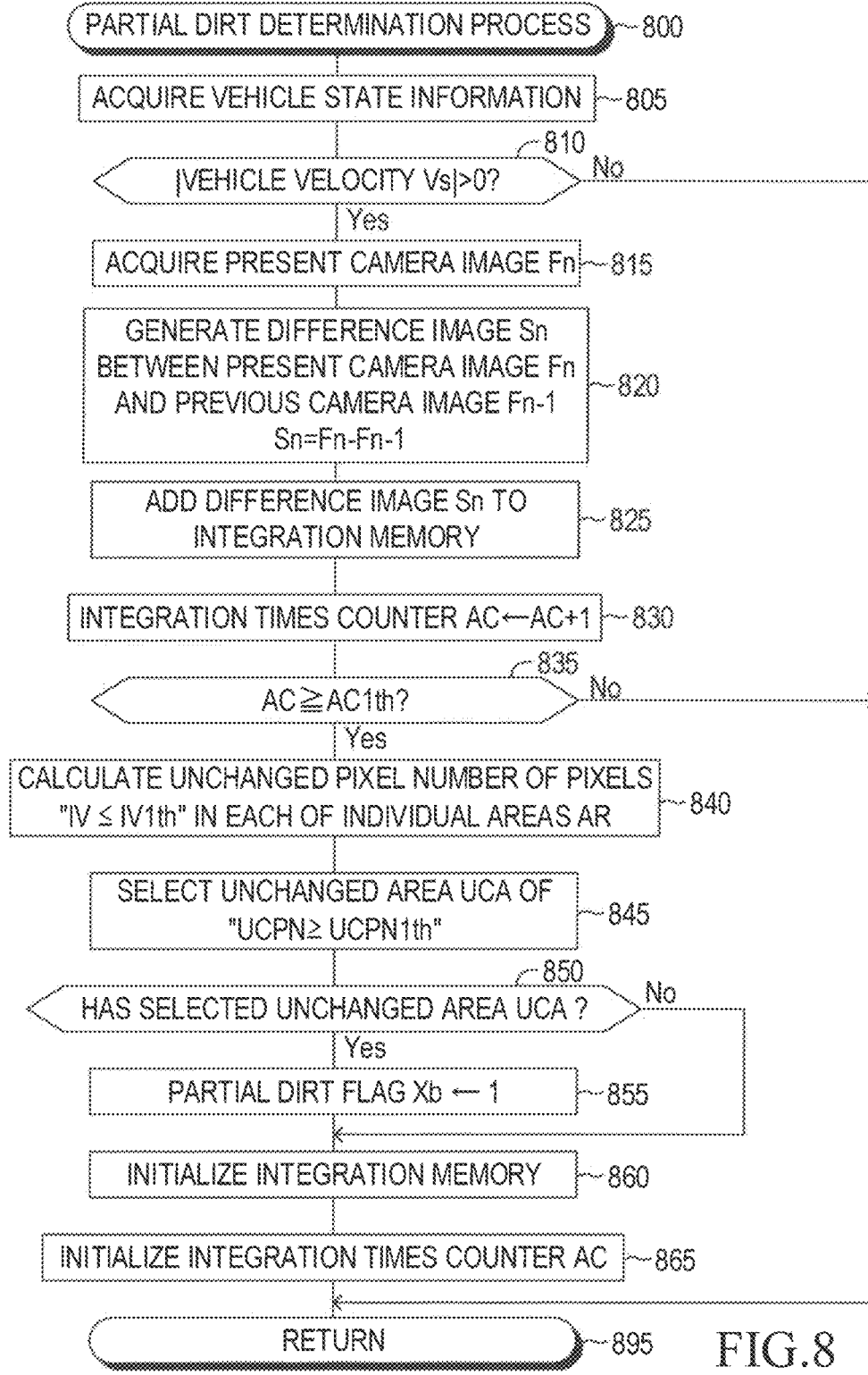
FIG. 8 is a flowchart illustrating another routine which is executed by the CPU of the monitor ECU illustrated in FIG. 1.

The CPU 11 executes a routine represented by a flowchart shown in FIG. 8, every time a predetermined time period elapses. The routine shown in FIG. 8 is a routine for determining whether or not the state of the protection window 22 is the partial dirt state.

When a predetermined timing has come, the CPU 11 starts the process from Step 800 shown in FIG. 8, and proceeds to Step 805 so as to acquire the vehicle state information from the vehicle state sensor 26.

Subsequently, the CPU 11 proceeds to Step 810 to determine whether or not the magnitude of the vehicle velocity Vs included in the vehicle state information acquired at Step 805 is greater than "0 m/s", in other words, whether or not the own vehicle SV is traveling.

When the magnitude of the vehicle velocity Vs is "0 m/s", the CPU 11 makes a "No" determination at Step 810, and proceeds to Step 895 so as to tentatively terminate the present routine. When the magnitude of the vehicle velocity Vs is "0 m/s", in other words, when the own vehicle SV stops, a probability that a present camera image Fn acquired at the present time point remains unchanged from a previous camera image Fn–1 acquired at the previous time point (i.e., a time point the predetermined time period before the present time point) is high, regardless of whether or not the partial dirt has adhered to the protection window 22. Therefore, when the magnitude of the vehicle velocity Vs is "0 m/s", the CPU 11 tentatively terminates the present routine so as not to execute processes of Steps at and after Step 815.

On the other hand, the magnitude of the vehicle velocity Vs is greater than "0 m/s", the CPU 11 makes a "Yes" determination at Step 810, and executes the processes from Step 815 to Step 830 in order so as to proceed to Step 835.

Step 815: The CPU 11 acquires the camera image information from the camera system 20 as the present camera image Fn. The "camera image acquired at Step 815 which was executed at the time point before the present time point by the predetermined time period" is referred to as a previous camera image Fn–1.

Step 820: The CPU 11 generates/produces a difference image Sn (Sn=Fn–Fn–1) between the present camera image Fn and the previous camera image Fn–1.

More specifically, the CPU 11 calculates a subtraction value by subtracting a pixel value of each of the pixels included in the previous camera image Fn–1 from a pixel value of the corresponding one of the pixels included in the present camera image Fn. Thereafter, the CPU 11 acquires the magnitude of the subtraction value of each of the pixels, as a pixel value of the corresponding one of the pixels included in the difference image Sn.

Step 825: The CPU 11 adds the difference image Sn to an integrated difference image stored in a specific part (hereinafter, referred to as an "integration memory") in the RAM 13 to obtain an integration result, and stores the integration result into the integration memory as a new integrated difference image. As a result, a total value (hereinafter, referred to as an "integration value") VI is calculated. The integration value VI represents a total of a magnitude of change of/in the pixel value of each of the pixels included in the camera image in a period from a time point when the integration memory was initialized to the present time point Step 830: The CPU 11 adds "1" to an integration times counter AC" to update the integration times counter AC. The integration times counter AC represents the number of times of integrating the difference image Sn.

Subsequently, the CPU proceeds to Step 835 to determine whether or not the value of the integration times counter AC is equal to or greater than a threshold counter value AC1th. Although, in the present example, the threshold counter value AC1th is set to "1", in some embodiments, the threshold counter value AC1th is set to a value other than "1". When the value of the integration times counter AC is smaller than the threshold counter value AC1th, the CPU 11 makes a "No" determination at Step 835, and directly proceeds to Step 895 so as to tentatively terminate the present routine. On the other hand, when the value of the integration value AC is equal to or greater than the threshold counter value AC1th, the CPU 11 makes a "Yes" determination at Step 835, and proceeds to Step 840.

At Step 840, the CPU 11 divides the difference image Sn into the individual areas AR so as to calculate the number of the pixels (hereinafter, referred to as an "unchanged pixel number") UCPN, each of the pixels having the integration value IV equal to or smaller than a threshold integration value (a changed amount determination value) IV1th, in/for each of the individual areas AR.

Subsequently, the CPU 11 proceeds to Step 845 to select the individual area AR (hereinafter, referred to as an "unchanged area UCA") with/having unchanged pixel number UCPN equal to or greater than a threshold pixel number UCPN1th. This unchanged area UCA can be expressed as the individual area AR where "density of the pixels (hereinafter, referred to as "unchanged pixels") with/having the integration value IV equal to or smaller than the threshold integration value IV1th" is equal to or higher than a threshold density.

Subsequently, the CPU 11 proceeds to Step 850 so as to determine whether or not the unchanged area UCA has been selected at Step 845. When the unchanged area UCA has been selected at Step 845, it can be determined that the partial dirt has adhered to the protection window 22.

In view of the above, when the unchanged area UCA has been selected, the CPU 11 makes a "Yes" determination at Step 850, executes the processes from Step 855 to Step 865 in order, and proceeds to Step 895 so as to tentatively terminate the present routine.

Step 855: The CPU 11 sets the value of the partial dirt flag Xb to "1". That is, the CPU 11 stores the partial dirt information into the RAM 13. At this time point, the CPU 11 stores "information to identify which individual area AR is the unchanged area UCA selected at Step 845" into the RAM 13.

When the value of the partial dirt flag Xb has already been set to "1" at the time point at which the CPU 11 executes the process at Step 855, the CPU 11 sets the value of the partial dirt flag Xb to "1" again, and stores "identification information of the unchanged area UCA which has been selected at Step 845" in the RAM 13.

Step 860: The CPU 11 deletes the difference image Sn stored in the integration memory so as to initialize the integration memory.

Step 865: The CPU 11 sets the value of the integration times counter AC to "0" so as to initialize the integration times counter AC.

In contrast, when the unchanged area UCA has not been selected at the time point at which the CPU 11 executes the process at Step 850, the CPU 11 makes a "No" determination at Step 850, and proceeds to the processes of Step 860 and thereafter.

As understood from the above example, when the CPU 11 has detected at least one of the individual areas AR where the "number of the pixels each of which has the pixel value that remains unchanged substantially for/over the predetermined time period" is equal to or greater than a threshold number, the CPU 11 determines that the state of the protection window 22 is the partial dirt state. This individual area AR is the unchanged area UCA having the unchanged pixel number UCPN which is equal to or greater than the threshold pixel number UCPN1th. Therefore, the CPU 11 can detect the dirt (for example, mud) which has adhered to a part of the surface of the protection window 22 as the partial dirt.

Figure 9:
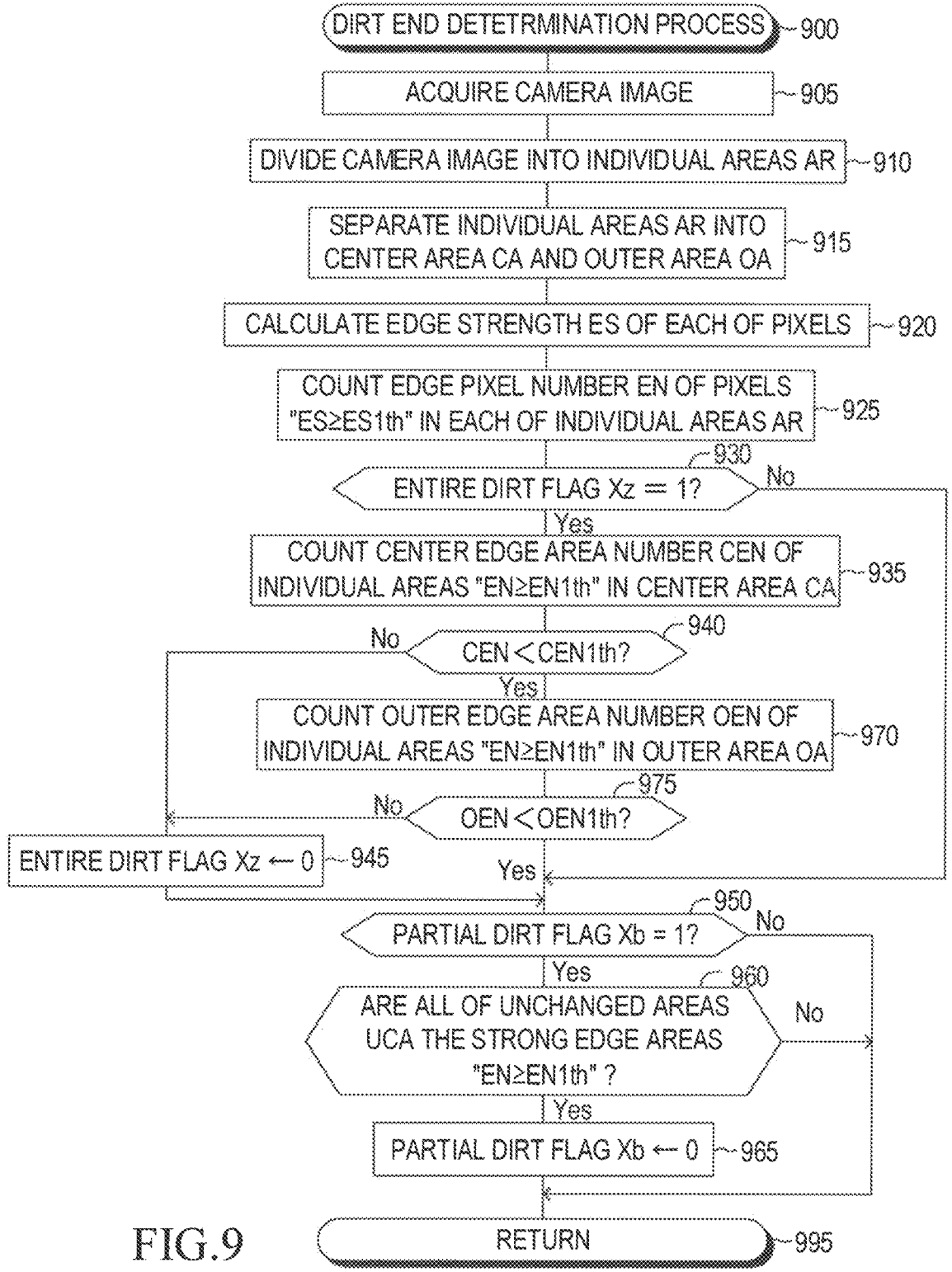
FIG. 9 is a flowchart illustrating another routine which is executed by the CPU of the monitor ECU illustrated in FIG. 1.

The CPU 11 executes a routine represented by a flowchart shown in FIG. 9, every time a predetermined time period elapses. The routine shown in FIG. 9 is a routine for determining whether or not the entire dirt which has adhered to the protection window 22 has been removed and the partial dirt which has adhered to the protection window 22 has been removed.

When a predetermined timing has come, the CPU 11 starts the process from Step 900 shown in FIG. 9, executes the processes from Step 905 to Step 925 in order, and proceeds to Step 930.

Step 905: The CPU 11 acquires the camera image information from the camera system 20.

Step 910: The CPU 11 divides the camera image into the individual areas AR, as with Step 715 shown in FIG. 7.

Step 915: The CPU 11 separates the individual areas AR into the individual areas AR included/encompassed in the center area CA and the individual areas AR included/encompassed in the outer area OA, as with Step 720 shown in FIG. 7.

Step 920: The CPU 11 calculates the edge strength of each of the pixels included in the individual areas AR, in accordance with the above expressions 1 through 3.

Step 925: The CPU 11 counts the edge pixel number EN representing the number of pixels, each of the pixels having the edge strength ES equal to or greater than the threshold strength ES1th, in/for each of the individual areas AR.

Subsequently, the CPU 11 proceeds to Step 930 to determine whether or not the value of the entire dirt flag Xz is "1". That is, the CPU 11 determines whether or not the entire dirt information has been stored in the RAM 13. When the value of the entire dirt flag Xz is "1", the CPU 11 makes a "Yes" determination at Step 930, and proceeds to Step 935.

At Step 935, the CPU 11 counts the number of the individual areas AR (the center edge area number CEN) which is encompassed/included in the center area CA and which has the edge pixel number EN equal to or greater than the threshold pixel number EN1th, as with Step 735 shown in FIG. 7. Subsequently, the CPU 11 proceeds to Step 940 to determine whether or not the center edge area number CEN is smaller than the threshold area number CEN1th.

When the center area edge area number CEN is equal to or greater than the threshold area number CEN1th, the CPU 11 determines that the entire dirt which has adhered to the protection window 22 has been removed. In this case, the CPU 11 makes a "No" determination at Step 940, and proceeds to Step 945 to set the value of the entire dirt flag Xz to "0". That is, the CPU 11 deletes the entire dirt information stored in the RAM 13. Thereafter, the CPU 11 proceeds to Step 950.

At Step 950, the CPU 11 determines whether or not the value the partial dirt flag Xb is "1". That is, the CPU 11 determines whether or not the partial dirt information has been stored in the RAM 13. When the value of the partial dirt flag Xb is "1", the CPU 11 makes a "Yes" determination at Step 950, and proceeds to Step 960.

At Step 960, the CPU 11 determines whether or not the "edge pixel number EN in each of the individual areas AR which has been selected as the unchanged area UCN at Step 845" is equal to or greater than the threshold pixel number EN1th. That is, the CPU 11 determines whether or not all of the unchanged areas UCA are (or have turned into) the strong edge areas (the individual area where the edges are detected clearly).

When a determination condition of Step 960 is established, the CPU 11 determines that all partial dirt which has adhered to the protection window 22 has been removed. In this case, the CPU 11 makes a "Yes" determination at Step 960, and proceeds to Step 965 so as to set the value of the partial dirt flag Xb to "0". That is, the CPU 11 deletes the partial dirt information stored in the RAM 13. Thereafter, the CPU 11 proceeds to Step 995 to tentatively terminate the present routine.

On the other hand, at the time point at which the CPU 11 proceeds to Step 930, the CPU 11 makes a "No" determination at Step 930 if the value of the entire dirt flag Xz is not "1" (in other words, the entire dirt information has not been stored in the RAM 13), to directly proceed to Step 950.

At the time point at which the CPU 11 proceeds to Step 940, the CPU 11 makes a "Yes" determination at Step 940 if the center edge area number CEN is smaller than the threshold area number CEN1th, and proceeds to Step 970. At Step 970, the CPU 11 counts the outer edge area number OEN, and proceeds to Step 975. The outer edge area number OEN represents the number of the individual areas AR which are encompassed/included in the outer area OA and each of which has the edge pixel number EN equal to or greater than the threshold pixel number EN1th.

At Step 975, the CPU 11 determines whether or not the outer edge area number OEN is smaller than the threshold area number (the second threshold area number) OEN1th. In this example, the threshold area number OEN1th is set to "1". When the outer edge area number OEN is equal to or greater than the threshold area number OEN1th, that is, when there is the individual area AR in which the edge is detected clearly and which is included/encompassed in the outer area where it is not easy for the edge to be dearly detected, the CPU 11 determines that the entire dirt which has adhered to the protection window 22 has been removed. When the outer edge area number OEN is equal to or greater than the threshold area number OEN1th, the CPU 11 makes a "No" determination at Step 975, and proceeds to Step 945 so as to set the value of the entire dirt flag Xz to "0". In contrast, when the outer edge area number OEN is smaller than the threshold area number OEN1th, the CPU 11 makes a "Yes" determination at Step 975, and directly proceeds to Step 950.

When the value of the partial dirt flag Xb is "0", that is, when the partial dirt value has not been stored in the RAM 13, at the time point at which the CPU 11 proceeds to Step 950, the CPU 11 makes a "No" determination at Step 950, and directly proceeds to Step 995 so as to tentatively terminate the present routine.

At the time point at which the CPU 11 proceeds to Step 960, if there is at least one of the individual area(s) AR which has the edge pixel number EN smaller than the threshold pixel number EN1th among the individual area(s) which has/have been selected as the unchanged area(s) UCA at Step 845, the CPU 11 determines that the partial dirt which has adhered to the protection window 22 has not been removed yet. In this case, the CPU 11 makes a "No" determination at Step 960, and directly proceeds to Step 995 so as to tentatively terminate the present routine.

As understood from the above example, in the case where the CPU 11 has determined that the entire dirt has adhered to the protection window 22, the CPU 11 determines that the entire dirt has been removed when at least one of the condition (1) and (or) the condition (2) is established, wherein the condition (1) is a condition that the center edge area number CEN is equal to or greater than the threshold area number CEN1th, and the condition (2) is a condition that the outer edge area number OEN is equal to or greater than the threshold area number OEN1th. Especially, the condition (2) is established, when the number (the outer edge area number OEN) of the strong edge areas encompassed in the outer area OA where the edge strength EA tends to be calculated as a smaller value, the strong edge area being an area where an edge is detected dearly. Therefore, when the entire dirt has been actually removed, the CPU 11 can accurately determine that the entire dirt has been removed based on the camera image even if that camera image is an image where no edge is to be detected in the center area CA.

In the case where the CPU 11 has determined that the partial dirt has adhered to the protection window 22, the CPU 11 determines that the partial dirt has been removed when the "condition that the edge pixel number EN is equal to or greater than the threshold pixel number EN1th" is established in all of the individual areas AR which have been selected as the partial dirt areas (the unchanged areas UCA). The CPU 11 determines whether or not the partial dirt has been removed without using the areas except the unchanged area UCA, and therefore, the CPU 11 can accurately determine whether or not the partial dirt has been removed.

As described above, the removal determination condition to be satisfied when determining that the entire dirt is removed has been different from the removal determination condition to be satisfied when determining that the partial dirt has been removed. In this manner, the CPU 11 sets/uses the removal determination condition corresponding to each type of the dirt which has adhered to the protection window 22 so that the CPU 11 can accurately determine that the dirt has been removed (regardless of the type of the dirt).

The present invention is not limited to the above-described embodiment, and can adopt various modifications of the present invention. In some embodiments, this monitor device sets the value of the entire dirt flag Xz to "1" at a timing at which a driver performs an operation to change a position of an ignition key switch of the own vehicle SV from an off position to an on position. This timing is referred to as a "timing of an initial state" or an "ignition start timing". Snow, frost, water droplets, or the like, may adhere to the protection window 22 in a period from a "time point at which the driver performs an operation to change the position of the ignition key switch from the on position to the off position so as to park the own vehicle SV" to a "time point at which the state of the own vehicle SV turns into the initial state", so that the dirt may adhere to the entire surface of the protection window 22. This monitor device can prohibit itself from performing the pre-collision control based on the camera image which may be inaccurate until it is determined that the entire dirt ends after the initial state.

In some embodiments, this monitor device has a temperature sensor for measuring temperature of the outside of the own vehicle SV (outside temperature). In this case, this monitor device acquires the outside temperature from the temperature sensor in the initial state. When the outside temperature is equal to or lower than a threshold temperature, this monitor device sets the value of the entire dirt flag Xz to "1". When the snow or the frost is likely to adhere to the protection window 22 in the initial state, this monitor device can prohibit itself from performing the pre-collision control based on the camera image which may be inaccurate.

In some embodiments, the threshold area number CEN1th used at Step 940 is different from the threshold area number OEN1th used at Step 975. In some embodiments, the threshold area number CEN1th is smaller than the threshold area number OEN1th, because the edge strength ES in the center area CA is calculated more accurately than the edge strength ES in the outer area OA. According to this embodiment, this monitor device can accurately determine that the entire dirt has been removed. In some embodiments, the threshold area number OEN1th is smaller than the threshold area number CEN1th, because the edge strength ES in the outer area OA tends to be calculated to be a relatively small value, as compared with the edge strength ES in the center area CA. According to this embodiment, this monitor device can determine that the entire dirt has been removed at an earlier stage.

In some embodiments, the threshold area number CEN1th used for the determination as to whether or not the state of the protection window 22 is the entire dirt state (the threshold area number CEN1th used at Step 740) is different from the threshold area number CEN1th used for the determination as to whether or not the entire dirt state ends (the threshold area number CEN1th used at Step 940). In this case, preferably, the threshold area number CEN1th used for the determination as to whether or not the entire dirt state ends is greater than the threshold area number CEN1th used for the determination as to whether or not the state of the protection window 22 is the entire dirt state.

In some embodiments, this monitor device calculates an average AVE of the edge strength ES in/for each of the individual areas AR instead of the process of Step 730. Thereafter, this monitor device counts, as the center edge area number CEN, the number of the individual areas AR, each of which is encompassed/included in the center area CA and has the average AVE equal to or greater than a threshold average AVE1th instead of the process of Step 735. Further, this monitor device counts, as the center edge area number CEN, the number of the individual areas AR, each of which is encompassed/included in the center area CA and has the average AVE equal to or greater than a threshold average AVE1th instead of the process of Step 935 shown in FIG. 9. Further, this monitor device counts, as a partial dirt edge number DEN, the number of the individual areas AR, each of which is encompassed/included in the unchanged area UCA and has the average AVE equal to or greater than the threshold average AVE1th instead of the process of Step 955. Thereafter, this monitor device counts, as the outer edge area number OEN, the number of the individual areas AR, each of which is encompassed/included in the outer area OA and has the average AVE equal to or greater than the threshold average AVE1th instead of the process of Step 970.

In some embodiments, when at least one of the entire dirt or the partial dirt has adhered to an unillustrated protection window of an unillustrated front camera which photographs a scene in front of the own vehicle SV and which is arranged in the front end of the own vehicle SV, this monitor device prohibits itself from performing a "pre-collision control when the own vehicle SV travels/runs forward" which is one of the support controls. In this embodiment, millimeter-wave radars are arranged at the center in the width direction of the front end of the own vehicle SV. Each of the radar sensors radiates a radio wave in a millimeter waveband (hereinafter referred to as "millimeter wave"). Thereafter, each of the radar sensors receives the reflected wave, and detects the location of the object in relation to the own vehicle SV and the relative velocity of the object in relation to the own vehicle SV. If the location of the object can be detected based on the front camera, the monitor device needs not to comprise the millimeter wave radars. This monitor device specifies the location of the object in front of the own vehicle SV based on the detection result of the millimeter wave radar and a camera image (hereinafter referred to as a "front camera image") photographed by the front camera. A processes for performing the pre-collision control when the own vehicle SV travels/runs forward differs from the processes of the routine shown in FIG. 6 only in performing the pre-collision control to the object in front of the own vehicle SV (instead of the object in the backward area of the own vehicle SV).

An entire dirt determination process for the protection window of the front camera is the same as the routine shown in FIG. 7, a partial dirt determination process for this protection window is the same as the routine shown in FIG. 8, and a process for determining whether or not the entire dirt and/or the partial dirt has adhered to this protection window is the same as the process of the routine shown in FIG. 9.

When the monitor device is configured to obtain/acquire the location of the object in relation to the own vehicle SV based on the camera image photographed by the camera 21, the monitor device does not necessarily have to comprise the clearance sonars 24.

In some embodiments, the clearance sonars 24 are sensors which radiate wireless media and receive the reflected wireless media so as to detect the object. Millimeter wave radars, infrared radars, or the like, are used in place of the clearance sonars 24.

The display unit 30 is not limited to the HUD. The display unit 30 may be a Multi Information Display (MID), a touch panel of the navigation device, or the like. The MID is a display panel which is arranged on a dash board and which includes a speed meter, a taco meter, a fuel gauge, an water temperature gauge, an od/trip meter, an warning lump, and the like.

What is claimed is:

1. A monitor device comprising:
    an electronic control unit (ECU) configured to:
        perform a support control to support driving of an own vehicle based on a camera image which includes pixels and which is acquired by a camera for photographing an area around the own vehicle through a protection window which is exposed to outside of the own vehicle;
        determine whether or not a protection window state is an entire dirt state where dirt has adhered to an entire surface of the protection window, based on edge strengths of the pixels; and
        determine whether or not the entire dirt state ends based on the edge strengths, when it has been determined that the protection window state has been the entire dirt state,
    wherein,
    the ECU is configured not to perform the support control, when it has been determined that the protection window state has been the entire dirt state, and
    the ECU is further configured to:
        determine that the protection window state is the entire dirt state, when a first area index value calculated based on the edge strengths of pixels included in a first area is smaller than a threshold dirt value, the first area encompassing a center of the camera image;
        determine that the entire dirt state ends, when a first condition is established,
        the first condition being a condition that the first area index value is equal to or greater than a first threshold end value, and
        determine that the entire dirt state ends, when a second condition is established,
        the second condition being a condition that a second area index value calculated based on the edge strengths of pixels included in a second area other than the first area in the camera image is equal to or greater than a second threshold end value,
        the second area surrounding the first area on an outer periphery thereof, and
        the edge strengths of the pixels in the first area are greater than the edge strengths of the pixels in the second area.

2. The monitor device according to claim 1,
    wherein the ECU is further configured to:
        calculate, as the first area index value, a value correlating with the number of pixels included in the first area, each of the pixels in the first area having an edge strength which is equal to or greater than a first threshold strength; and
        calculate, as the second area index value, a value correlating with the number of pixels included in the second area, each of the pixels in the second area having an edge strength which is equal to or greater than a second threshold strength.

3. The monitor device according to claim 2, wherein the first area is divided into a plurality of individual areas; and wherein
    the ECU is further configured to:
        calculate, as the first area index value, a first edge area number indicative of the number of individual areas, each of the individual areas satisfying a condition that the number of pixels included in each of the individual areas is equal to or greater than a first threshold pixel number, each of the pixels having the edge strength equal to or greater than the first threshold strength; and
        determine that the protection window state is the entire dirt state, when the first edge area number is smaller than a first threshold area number serving as the threshold dirt value.

4. The monitor device according to claim 2, wherein the second area is divided into a plurality of individual areas; and wherein
    the ECU is further configured to:
        calculate, as the second area index value, a second edge area number indicative of the number of individual areas, each of the individual areas satisfying a condition that the number of pixels included in each of the individual areas is equal to or greater than a second threshold pixel number, each of the pixels having the edge strength equal to or greater than the second threshold strength; and
        determine that the second condition is established, when the second edge area number is equal to or greater than a second threshold area number serving as the second threshold end value.

5. The monitor device according to claim 1, wherein the first area and the second area are divided into a plurality of individual areas; and wherein
    the ECU is further configured to:
        determine that the protection window state is a partial dirt state where the dirt has adhered to a part of the surface of the protection window corresponding to an unchanged area which is the individual area where the number of the pixels satisfying a third condition is equal to or greater than a threshold pixel number, the third condition being a condition that a change amount in a pixel value of each of the pixels included in the individual area in a predetermined time period is equal to or smaller than a threshold amount, when the camera image includes the unchanged area, and not to perform the support control, when it has been determined that the protection window state has been the partial dirt state.

6. The monitor device according to claim 5,
wherein, in the event of the ECU determining that the protection window state has been the partial dirt state, the ECU is configured to determine that the partial dirt state corresponding to the unchanged area ends, when the number of the pixels becomes equal to or greater than a third strength threshold, each of the pixels being included in the unchanged area and having an edge strength equal to or greater than a third strength threshold.

7. The monitor device according to claim 1,
wherein the ECU is further configured to determine that the protection window state is the entire dirt state, when the own vehicle starts to be operated for running.

* * * * *